United States Patent
Chun et al.

(10) Patent No.: US 8,958,411 B2
(45) Date of Patent: Feb. 17, 2015

(54) METHOD OF TRANSMITTING RLC DATA

(75) Inventors: Sung-Duck Chun, Gyeonggi-Do (KR); Seung-June Yi, Gyeonggi-Do (KR); Sung-Jun Park, Gyeonggi-Do (KR); Young-Dae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 549 days.

(21) Appl. No.: 12/922,538

(22) PCT Filed: Mar. 17, 2009

(86) PCT No.: PCT/KR2009/001342
§ 371 (c)(1),
(2), (4) Date: Sep. 14, 2010

(87) PCT Pub. No.: WO2009/116788
PCT Pub. Date: Sep. 24, 2009

(65) Prior Publication Data
US 2011/0019756 A1    Jan. 27, 2011

Related U.S. Application Data

(60) Provisional application No. 61/037,309, filed on Mar. 17, 2008, provisional application No. 61/038,395, filed on Mar. 20, 2008.

(51) Int. Cl.
*H04W 74/06* (2009.01)
*H04L 1/16* (2006.01)
*H04L 1/18* (2006.01)

(52) U.S. Cl.
CPC ............. *H04L 1/1685* (2013.01); *H04L 1/188* (2013.01); *H04L 1/1887* (2013.01)

USPC .................. 370/346; 455/452.1; 370/449

(58) Field of Classification Search
CPC ...... H04L 1/8774; H04L 1/1685; H04L 69/28
See application file for complete search history.

(56) References Cited

U.S. PATENT DOCUMENTS 6,445,917 B1   9/2002  Bark et al.
6,594,240 B1   7/2003  Chuah et al.
(Continued)

FOREIGN PATENT DOCUMENTS

CN     1339903 A    3/2002
CN     1396780 A    2/2003
(Continued)

OTHER PUBLICATIONS

U.S. Appl. No. 12/672,835 Office Action dated Aug. 30, 2012.
(Continued)

*Primary Examiner* — Asad Nawaz
*Assistant Examiner* — Jason Harley
(74) *Attorney, Agent, or Firm* — Morgan, Lewis & Bockius LLP

(57) ABSTRACT

A method of transmitting data is performed by detecting a triggering of a first event, further detecting a triggering of a second event until a third event occurs, and performing a first action if the triggering of the second event is not detected, wherein the first action is based on the detected first event. The first event may be the expiry of a poll retransmit timer, the second event may be a detecting whether a ACK or NACK is not received, the third event may be a next transmission opportunity, and the first action may be setting a polling bit of a data PDU to be transmitted.

4 Claims, 3 Drawing Sheets

(56) References Cited

U.S. PATENT DOCUMENTS

| | | |
|---|---|---|
| 6,594,244 B1 | 7/2003 | Chang et al. |
| 6,728,918 B1 | 4/2004 | Ikeda et al. |
| 6,862,450 B2 | 3/2005 | Mikola et al. |
| 7,171,163 B2 | 1/2007 | Terry et al. |
| 7,181,667 B2 | 2/2007 | Argyropoulos et al. |
| 7,227,856 B2 | 6/2007 | Wu |
| 7,227,868 B2 | 6/2007 | Inden |
| 7,313,116 B2 | 12/2007 | Lee et al. |
| 7,400,593 B2 | 7/2008 | Choi et al. |
| 7,450,933 B2 | 11/2008 | Kwak et al. |
| 7,486,699 B2 | 2/2009 | Yi et al. |
| 7,525,908 B2 | 4/2009 | Olsson et al. |
| 7,706,410 B2 | 4/2010 | Chun et al. |
| 7,710,930 B2 | 5/2010 | Kwak |
| 7,817,595 B2 | 10/2010 | Wu |
| 7,876,771 B2 | 1/2011 | Bergstrom et al. |
| 7,894,444 B2 | 2/2011 | Lohr et al. |
| 7,978,616 B2 | 7/2011 | Chun et al. |
| 8,027,363 B2 | 9/2011 | Chun et al. |
| 8,031,689 B2 | 10/2011 | Guo |
| 8,059,597 B2 | 11/2011 | Park et al. |
| 8,081,662 B2 | 12/2011 | Chun et al. |
| 8,130,687 B2 | 3/2012 | Cai et al. |
| 8,160,012 B2 | 4/2012 | Chun et al. |
| 8,190,144 B2 | 5/2012 | Chun et al. |
| 8,203,988 B2 | 6/2012 | Chun et al. |
| 8,243,931 B2 | 8/2012 | Yi et al. |
| 2002/0024972 A1 | 2/2002 | Yi et al. |
| 2002/0114280 A1 | 8/2002 | Yi et al. |
| 2002/0122411 A1 | 9/2002 | Zimmerman et al. |
| 2003/0099305 A1 | 5/2003 | Yi et al. |
| 2004/0008659 A1 | 1/2004 | Kim |
| 2004/0076182 A1 | 4/2004 | Wu |
| 2004/0103435 A1 | 5/2004 | Yi et al. |
| 2004/0117860 A1 | 6/2004 | Yi et al. |
| 2004/0148396 A1 | 7/2004 | Meyer et al. |
| 2004/0153852 A1 | 8/2004 | Wu |
| 2004/0184438 A1 | 9/2004 | Terry |
| 2004/0223507 A1* | 11/2004 | Kuchibhotla et al. ......... 370/428 |
| 2004/0229626 A1 | 11/2004 | Yi et al. |
| 2005/0026597 A1 | 2/2005 | Kim et al. |
| 2005/0039101 A1 | 2/2005 | Torsner |
| 2005/0041663 A1 | 2/2005 | Jiang |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0100048 A1 | 5/2005 | Chun et al. |
| 2005/0105499 A1 | 5/2005 | Shinozaki et al. |
| 2005/0118992 A1 | 6/2005 | Jeong et al. |
| 2005/0147040 A1 | 7/2005 | Vayanos et al. |
| 2005/0164683 A1 | 7/2005 | Roberts et al. |
| 2005/0169293 A1 | 8/2005 | Zhang et al. |
| 2005/0192021 A1 | 9/2005 | Lee et al. |
| 2005/0193309 A1 | 9/2005 | Grilli et al. |
| 2005/0201354 A1 | 9/2005 | Hosaka et al. |
| 2005/0213605 A1 | 9/2005 | Kim et al. |
| 2005/0237932 A1 | 10/2005 | Liu |
| 2005/0238051 A1 | 10/2005 | Yi et al. |
| 2005/0254467 A1 | 11/2005 | Li et al. |
| 2005/0286483 A1 | 12/2005 | Lee et al. |
| 2005/0287957 A1 | 12/2005 | Lee et al. |
| 2006/0007886 A1 | 1/2006 | Lee et al. |
| 2006/0056441 A1 | 3/2006 | Jiang |
| 2006/0067238 A1* | 3/2006 | Olsson et al. ................. 370/242 |
| 2006/0067364 A1 | 3/2006 | Jung et al. |
| 2006/0092972 A1 | 5/2006 | Petrovic et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth et al. |
| 2006/0165045 A1 | 7/2006 | Kim et al. |
| 2006/0182065 A1 | 8/2006 | Petrovic et al. |
| 2006/0203780 A1 | 9/2006 | Terry |
| 2006/0233200 A1 | 10/2006 | Fifield et al. |
| 2006/0251105 A1 | 11/2006 | Kim et al. |
| 2006/0264179 A1 | 11/2006 | Bonneville et al. |
| 2006/0274690 A1 | 12/2006 | Chun et al. |
| 2007/0047452 A1* | 3/2007 | Lohr et al. ..................... 370/242 |
| 2007/0047493 A1 | 3/2007 | Park et al. |
| 2007/0053309 A1 | 3/2007 | Poojary et al. |
| 2007/0079207 A1 | 4/2007 | Seidel et al. |
| 2007/0081513 A1 | 4/2007 | Torsner |
| 2007/0091810 A1* | 4/2007 | Kim et al. ...................... 370/236 |
| 2007/0097913 A1 | 5/2007 | Hanov |
| 2007/0117579 A1 | 5/2007 | Cai et al. |
| 2007/0183358 A1 | 8/2007 | Cai |
| 2007/0189205 A1 | 8/2007 | Terry et al. |
| 2007/0201397 A1 | 8/2007 | Zhang |
| 2007/0223526 A1 | 9/2007 | Jiang |
| 2007/0258591 A1 | 11/2007 | Terry et al. |
| 2007/0274278 A1 | 11/2007 | Choi et al. |
| 2007/0297360 A1 | 12/2007 | Joachim et al. |
| 2007/0297367 A1 | 12/2007 | Wang et al. |
| 2008/0008152 A1 | 1/2008 | Lohr et al. |
| 2008/0043658 A1 | 2/2008 | Worrall |
| 2008/0045224 A1 | 2/2008 | Lu et al. |
| 2008/0051098 A1 | 2/2008 | Rao |
| 2008/0059859 A1 | 3/2008 | Marinier et al. |
| 2008/0069108 A1 | 3/2008 | Yi et al. |
| 2008/0084851 A1 | 4/2008 | Kim et al. |
| 2008/0089285 A1 | 4/2008 | Pirskanen et al. |
| 2008/0101609 A1 | 5/2008 | Jiang |
| 2008/0146242 A1 | 6/2008 | Alanara et al. |
| 2008/0165717 A1 | 7/2008 | Chen et al. |
| 2008/0165755 A1 | 7/2008 | Marinier et al. |
| 2008/0182609 A1 | 7/2008 | Somasundaram et al. |
| 2008/0186944 A1 | 8/2008 | Suzuki et al. |
| 2008/0186946 A1 | 8/2008 | Marinier et al. |
| 2008/0198869 A1 | 8/2008 | Jiang |
| 2008/0212561 A1 | 9/2008 | Pani et al. |
| 2008/0212605 A1* | 9/2008 | Jiang ............................. 370/449 |
| 2008/0233941 A1 | 9/2008 | Jen |
| 2008/0268878 A1 | 10/2008 | Wang et al. |
| 2008/0273482 A1 | 11/2008 | Lee et al. |
| 2008/0318566 A1 | 12/2008 | Chun et al. |
| 2008/0318578 A1 | 12/2008 | Worrall |
| 2009/0005058 A1 | 1/2009 | Kazmi et al. |
| 2009/0016301 A1 | 1/2009 | Sammour et al. |
| 2009/0046631 A1 | 2/2009 | Meylan et al. |
| 2009/0046695 A1 | 2/2009 | Jiang |
| 2009/0104890 A1 | 4/2009 | Wang et al. |
| 2009/0116434 A1 | 5/2009 | Lohr et al. |
| 2009/0119564 A1* | 5/2009 | Sagfors et al. ................. 714/748 |
| 2009/0175163 A1 | 7/2009 | Sammour et al. |
| 2009/0190480 A1* | 7/2009 | Sammour et al. ............. 370/242 |
| 2009/0232076 A1 | 9/2009 | Kuo |
| 2009/0259908 A1 | 10/2009 | Gollapudi |
| 2010/0014466 A1 | 1/2010 | Meyer et al. |
| 2010/0091750 A1 | 4/2010 | Lee et al. |
| 2010/0128648 A1 | 5/2010 | Lee et al. |
| 2010/0142429 A1 | 6/2010 | Yi et al. |
| 2010/0142457 A1 | 6/2010 | Chun et al. |
| 2010/0157904 A1 | 6/2010 | Ho et al. |
| 2010/0172282 A1 | 7/2010 | Zhang et al. |
| 2010/0232335 A1 | 9/2010 | Lee et al. |
| 2011/0019604 A1 | 1/2011 | Chun et al. |
| 2011/0033048 A1 | 2/2011 | Stanwood et al. |
| 2011/0149865 A1 | 6/2011 | Lee et al. |

FOREIGN PATENT DOCUMENTS

| | | |
|---|---|---|
| CN | 1613210 A | 5/2005 |
| CN | 1642067 A | 7/2005 |
| CN | 1761260 A | 4/2006 |
| CN | 1761356 A | 4/2006 |
| CN | 1846365 A | 10/2006 |
| CN | 1868157 A | 11/2006 |
| CN | 1918825 A | 2/2007 |
| CN | 1938969 A | 3/2007 |
| CN | 1954521 A | 4/2007 |
| CN | 101047966 | 10/2007 |
| EP | 1263160 A1 | 4/2002 |
| EP | 1326397 A2 | 7/2003 |
| EP | 1 509 011 A2 | 2/2005 |

(56) References Cited

FOREIGN PATENT DOCUMENTS

| | | | |
|---|---|---|---|
| EP | 1638237 | A2 | 3/2006 |
| EP | 1 768 297 | A2 | 3/2007 |
| EP | 2026523 | A1 | 2/2009 |
| EP | 2108223 | A1 | 10/2009 |
| JP | 07-162948 | A | 6/1995 |
| JP | 2000-324161 | A | 11/2000 |
| JP | 2001-197021 | A | 7/2001 |
| JP | 2002-198895 | | 7/2002 |
| JP | 2003-018050 | A | 1/2003 |
| JP | 2003-115796 | A | 4/2003 |
| JP | 2003-115876 | A | 4/2003 |
| JP | 2003-516021 | A | 5/2003 |
| JP | 2003-229925 | A | 8/2003 |
| JP | 2003-283592 | A | 10/2003 |
| JP | 2005-073276 | A | 3/2005 |
| JP | 2006-054718 | A | 2/2006 |
| JP | 2006-505209 | A | 2/2006 |
| JP | 2006-514466 | A | 4/2006 |
| JP | 2006-121562 | A | 5/2006 |
| JP | 2006-311543 | | 11/2006 |
| JP | 2007-116639 | A | 5/2007 |
| JP | 2007-312244 | | 11/2007 |
| JP | 2008-520125 | A | 6/2008 |
| JP | 2009-513058 | A | 3/2009 |
| JP | 2009-521893 | A | 6/2009 |
| KR | 10-2001-0045783 | A | 5/2001 |
| KR | 2003-0087914 | | 11/2003 |
| KR | 10-2005-0103127 | | 10/2005 |
| KR | 10-2005-0103127 | A | 10/2005 |
| KR | 10-2006-0004935 | A | 1/2006 |
| KR | 10-2006-0029452 | | 4/2006 |
| KR | 10-2006-0051278 | A | 5/2006 |
| KR | 10-2006-0090191 | A | 8/2006 |
| KR | 20070076374 | A | 7/2007 |
| KR | 10-2008-0051278 | A | 6/2008 |
| KR | 10-2008-0090191 | A | 10/2008 |
| KR | 10-0907978 | B1 | 3/2009 |
| KR | 10-2009-0084756 | A | 8/2009 |
| RU | 2291594 | C2 | 1/2007 |
| RU | 2304348 | C2 | 8/2007 |
| TW | 496058 | B | 7/2002 |
| WO | 01/37473 | A1 | 5/2001 |
| WO | 2004/042953 | A1 | 5/2004 |
| WO | 2004042964 | A | 5/2004 |
| WO | 2004073347 | A | 8/2004 |
| WO | 2005/078967 | A1 | 8/2005 |
| WO | 2005/122441 | | 12/2005 |
| WO | 2006/009714 | A1 | 1/2006 |
| WO | 2006/016785 | A1 | 2/2006 |
| WO | 2006/033521 | A1 | 3/2006 |
| WO | 2006/052086 | A2 | 5/2006 |
| WO | 2006/083149 | A1 | 8/2006 |
| WO | 2006/095385 | A1 | 9/2006 |
| WO | 2006/104335 | A2 | 10/2006 |
| WO | 2006/104342 | A2 | 10/2006 |
| WO | 2006/116620 | A2 | 11/2006 |
| WO | 2006/118418 | A2 | 11/2006 |
| WO | 2006/118435 | A1 | 11/2006 |
| WO | 2007020070 | A2 | 2/2007 |
| WO | 2007/023364 | A1 | 3/2007 |
| WO | 2007/039023 | A1 | 4/2007 |
| WO | 2007-045505 | A1 | 4/2007 |
| WO | 2007/052921 | A1 | 5/2007 |
| WO | 2007/078174 | A1 | 7/2007 |
| WO | 2007/079085 | A2 | 7/2007 |
| WO | 2007/091831 | | 8/2007 |
| WO | 2007147431 | A1 | 12/2007 |
| WO | 2008/004725 | A1 | 1/2008 |
| WO | 2008010063 | A2 | 1/2008 |
| WO | 2008/094120 | A1 | 8/2008 |
| WO | 2009/035301 | A2 | 3/2009 |

OTHER PUBLICATIONS

U.S. Appl. No. 12/668,199 Office Action dated Aug. 24, 2012.
U.S. Appl. No. 13/150,892 Notice of Allowance dated Aug. 24, 2012.
Cohen, Reuven, "An Improved SSCOP-like Scheme for Avoiding Unnecessary Retransmissions and Achieving Ideal Throughput." Proceedings of IEEE, vol. 2, Mar. 24, 1996, p. 855-862, (XP 010158150).
European Office Action issued in corresponding EP Application No. 08766509.7 on Aug. 31, 2011.
Office Action dated Jul. 21, 2011, issued for corresponding RU Patent Application 2010115253.07.
"3GPP TS 36.232 V8.2.1," 3rd Generation Partnership Project; Technical Specification Group Radio Access Network; Evolved Universal Terrestrial Radio Access (E-UTRA); Packet Data Convergence Protocol (PDCP) Specification (Release 8), p. 1-26.
R1-070649, 3GPP TSG-RAN WG1 #48, Feb. 12-16, 2007, p. 1-4.
R2-073574, 3GPP TSG RAN WG2 #59, Aug. 20-24, 2007, p. 1-4.
R2-080969, 3GPP TSG RAN WG2 #61, Feb. 11-15, 2008, p. 1-3.
R2-080902, 3GPP TSG RAN WG2 #61, Jan. 14-18, 2008, p. 1-2.
R2-081594, 3GPP TSG-RAN2 Meeting #61bis, Mar. 31-Apr. 4, 2008, p. 1-8.
U.S. Appl. No. 12/363,007 Office Action dated Jul. 13, 2011.
U.S. Appl. No. 12/143,607 Office Action dated Jul. 14, 2011.
U.S. Appl. No. 12/733,179 Office Action dated Jul. 22, 2011.
U.S. Appl. No. 12/817,819 Office Action dated Apr. 13, 2011.
U.S. Appl. No. 12/212,546 Office Action dated May 13, 2011.
TSG-RAN WG2 Meeting #60, Jeju, Korea, *Framework for Scheduling Request and Buffer Status Reporting*, Nov. 5-9, 2007, pp. 1-4.
3GPP TSG RAN1#47, Riga, Latvia, *Synchronized Random Access Channel and Scheduling Request*, Nov. 6-10, 2006, pp. 1-3.
3GPP TSG RAN WG2#54, Tallinn, Estonia, *Basic Principles for the Scheduling Request in LTE*, Aug. 28-Sep. 1, 2006, pp. 1-2.
3GPP TSG RAN WG1 Meeting #47, Riga, Latvia, *Scheduling Request Transmission Method for E-UTRA Uplink*, Nov. 6-10, 2006, pp. 1-6.
3GPP TSG-RAN WG2#47bis, Sorrento, Italy, *Scheduling Request in E-UTRAN*, Jan. 15-19, 2007. pp. 1-11.
U.S. Appl. No. 12/405,677 Office Action dated Sep. 27, 2010.
U.S. Appl. No. 12/817,819 Office Action dated Sep. 23, 2010.
U.S. Appl. No. 60/976,139, filed Sep. 28, 2007.
U.S. Appl. No. 61/019,058, filed Jan. 4, 2008.
LG Electronics, Inc., *UE state transition in LTE_ACTIVE*, Mar. 27-31, 2006, pp. 1-3.
Texas Instruments, *UL Synchronization Management and Maintenance in E-UTRA*, May 7-11, 2007, pp. 1-7.
Motorola, *Contention-free Intra-LTE Handover*, Feb. 2-16, 2007, pp. 1-3.
Ericsson, *Scheduling Request in E-UTRAN*, Jan. 15-19, 2007, pp. 1-11.
ZTE, *Redundant retransmission restraint in RLC-AM*, May 8-12, 2006, pp. 1-5.
Notice of Allowance issued in corresponding U.S. Appl. No. 12/677,945 dated Aug. 14, 2012.
Office Action issued in corresponding Chinese Patent Application No. 200880107904.7 dated Jul. 30, 2012.
Office Action dated Dec. 15, 2010 in related U.S. Appl. No. 12/452,433.
U.S. Appl. No. 12/362,993 Office Action dated Jul. 24, 2010.
U.S. Appl. No. 12/362,993, filed Jan. 30, 2009, inventors Young Dae Lee et al.
U.S. Appl. No. 60/944,662, filed Jun. 18, 2007, inventor Tsyoshi Kashima.
U.S. Appl. No. 61/006,348, filed Jan. 8, 2008, inventors Li-Chen Lin et al.
Office Action issued in corresponding U.S. Appl. No. 12/452,733 dated Jun. 11, 2012.
Office Action issued in corresponding JP Patent Application No. 2010-550608 dated Jun. 12, 2012.
Office Action issued in corresponding U.S. Appl. No. 12/673,741 dated Jul. 19, 2012.
Office Action issued in corresponding U.S. Appl. No. 12/739,282 dated Jul. 10, 2012.
Jiang, Asustek Computer Inc., HFN de-synchronization detection with Integrity Protection scheme in a wireless communications. U.S. Appl. No. 60/863,800.

(56) References Cited

OTHER PUBLICATIONS

Notice of Allowance issued in corresponding JP Patent Application No. 2010-527899 dated Jun. 29, 2012.
3GPP TSG RAN WG2 #59bis LTE User Plane Session report Shanghai, China, Oct. 8-12, 2008.
3GPP TS 25.321 3rd Generation Patnership Project: Technical Specification Group Radio Access Network: Medium Access Control (MAC) protocol specification (Jun. 2007).
Office Action issued in corresponding CN Patent Application No. 200880116346.0 dated Jun. 20, 2012.
R2-074701 TSG-RAN WG2 Meeting #60 Jeju Island, Korea Nov. 5-9, 2007.
Office Action issued in corresponding CN Patent Application No. 200880102631.7 dated Jun. 15, 2012.
Office Action issued in corresponding U.S. Appl. No. 12/682,841 dated Jun. 13, 2012.
Notice of Allowance issued in corresponding JP Patent Application No. 2010-513117 dated Jul. 25, 2012.
LG Electronics, Update of eUtram PDCP specification, R2-081390, 3GPP, Feb. 22, 2008.
Office Action issued in corresponding CN Patent Application No. 200980100119.3 dated Jun. 18, 2012.
Notice of Allowance issued in corresponding JP Patent Application No. 2010-515984 dated Jun. 15, 2012.
3GPP TS 36.321 3rd Generation Partnership Project; Technical Specification Group Radio Access Network; Evolved Universal Terrestrial Radio Access (E-UTRA) Medium Access Control (MAC) protocol specification (Release 8) Sep. 2007.
Universal Mobile Telecommunications System (UMTS); Radio Link Control (RLC) protocol specification (3GPP TS 25.322 version 4.10.0 Release 4).
3GPP TSG-RAN WG2 #61bis Mar. 31-Apr. 4, 2008, Shenzhen China, Correction to Polling Procedure.
Extended European Search Report issued in corresponding European Patent Application No. 09722068.5 dated May 24, 2012.
Office Action issued in corresponding Chinese Patent Application No. 200880112798.1 dated May 3, 2012.
Office Action issued in corresponding U.S. Appl. No. 12/602,763 dated May 11, 2012.
Ghosh et al., "Random Access Design for UMTS Air-Interface Evolution," IEEE, 1041-1045.
Notice of Allowance issued in related Korean Patent Application No. 10-2009-0022158 dated Apr. 24, 2012.
Office Action issued in related U.S. Appl. No. 12/671,020 dated Apr. 18, 2012.
Office Action issued in related U.S. Appl. No. 12/672,999 dated May 1, 2012.
Office Action issued in related Chinese Patent Application No. 200880107176 dated Apr. 13, 2012.
Notice of Allowance issued in related Japanese Patent Application No. 2012-049342 dated Apr. 10, 2012.
Office Action of JP Appl. No. 2010-513117 dated Mar. 15, 2012.
Office Action of JP Appl. No. 2010-525754 dated Mar. 8, 2012.
Extended European Search Report of EP Appl. No. 11009737.5 dated Mar. 27, 2012.
Notice of Allowance of TW Appl. No. 097135865 dated Feb. 21, 2012.
Office Action of GB Appl. No. 1002893.4 dated Feb. 21, 2012.
Office Action of JP Appl. No. 2010-524793 dated Feb. 21, 2012.
Office Action of JP Appl. No. 2010-523965 dated Mar. 1, 2012.
R2-073556 3GPP TSG-RAN WG#59, "Considerations on Scheduling Information," Athens, Greece, Aug. 20-24, 2007.
R2-072833 3GPP TSG-RAN-WG2 Meeting #58bis, "Buffer Status Reporting with Group Combining for LTE," Orland, USA, Jun. 25-29, 2007.
Office Action of JP Appl. No. 2010-515984 dated Feb. 22, 2012.
R2-050318 3GPP TSG RAN WG2 #46, "Summary of HFN desynchronization problem off-line email discussion," Scottsdale, USA, Feb. 14-18, 2005.
R2-041940 3GPP TSG-RAN WG2 meeting #44, "On-line recovery of HFN synchronization due to RLC UM SN problem," Sophia-Antipolis, France, Oct. 4-8, 2004.
3GPP TSG-RAN WG1 #48bis (R1-071276) Mar. 26-30, 2007 St. Julian, Malta, pp. 1-4.
3GPP TSG RAN WG1 #49bis (R1-072859) Jun. 25-29, 2007 Orlando, Florida, pp. 1-5.
3GPP TSG-RAN2 Meeting #59 (R2-073863) Jun. 20-24, 2007 Athens, Greece, pp. 1-94.
3GPP TSG-RAN WG2 #59 (R2-073230) Aug. 20-24, 2007 Athens, Greece, pp. 1-3.
3GPP TSG-RAN2 Meeting #59bis (R2-074419) Oct. 8-12, 2007 Shanghai, China, pp. 1-3.
3GPP TSG RAN WG2 #59bis (R2-074174) Oct. 8-12, 2007 Shanghai, China, pp. 1-5.
3rd Generation Partnership Project; Technical Specification Group Radio Access Network; Evolved Universal Terrestrial Radio Access (E-UTRA) Medium Access Control (MAC) protocol specification (3GPP TS36.321 v1.0.0) pp. 2-19.
3GPP TSG RAN WG2 #59bis (R2-074536) Oct. 8-12, 2008 Shanghai, China, pp. 1-24.
3rd Generation Partnership Project; Technical Specification Group Radio Access Network; Medium Access Control (MAC) protocol specification (3GPP TS25.321 v7.5.0) pp. 2-11.
Office Action from technically related U.S. Appl. No. 12/363,007 dated Feb. 3, 2012.
Office Action from technically related Great British Patent Application No. 100406.7 dated Feb. 3, 2012.
Notice of Allowance from technically related Japanese Patent Application No. 2010-524787 dated Feb. 7, 2012.
Office Action from technically related Japanese Patent Application No. 2010-519877 dated Jan. 27, 2012.
Office Action from technically related Japanese Patent Application No. 2010-527899 dated Feb. 10, 2012.
Office Action from technically related Chinese Patent Application No. 200980000483.2 dated Jan. 11, 2012.
3rd Generation Partnership Project; Technical Specification Group radio Access Network; Evolved Universal Terrestrial Radio Access (E-UTRA) Radio Link Control (RLC) protocol specification (Release 8); 3GPP TS 36.332 V8.0.0, pp. 11-30, 2007.
Change Request 3GPP TSG-RAN2 Meeting #61bis Shenzhen, China, Mar. 31-Apr. 4, 2008, 3GPP TS 36.332 V8.0.0.
Change Request 3GPP TSG-RAN2 Meeting #61bis Shenzhen, China, Mar. 31-Apr. 4, 2008, R2-081700.
3GPP TSG-RAN WG2 #62 May 5-9, 2008, Kansas City, R2-082133.
Russian Notice of Allowance from related Russian Application No. 2010115253 dated Dec. 2, 2011.
Russian Notice of Allowance from related Russian Application No. 2010115272 dated Dec. 2, 2011.
Japanese Office Action from related Japanese Application No. 2009-551643 dated Dec. 12, 2011.
Japanese Office Action from related Japanese Application No. 2010-513117 dated Dec. 13, 2011.
US Office Action from related U.S. Appl. No. 12/672,999 dated Dec. 29, 2011.
US Office Action from related U.S. Appl. No. 12/669,022 dated Jan. 12, 2012.
R2-061002—3GPP TSG-RAN WG2 #52, LG Electronics Inc., "UE State Transition in LTE__ACTIVE," Athens, Greece, Mar. 27-31, 2006.
R1-072198—3GPP TSG RAN WG1 #49, Texas Instruments, UL Synchronization Management and Maintenance in E-UTRA, Kobe, Japan, May 7-11, 2007.
R1-071478—3GPP TSG RAN WG1 #48bis, Texas Instruments, "UL Synchronization Management in LTE__ACTIVE," St. Julians, Malta, Mar. 26-30, 2007.
Japanese Office Action dated Nov. 22, 2011, issued in a corresponding Japanese patent application.
Taiwanese Office Action dated Nov. 1, 2011, issue in a corresponding Taiwanese patent application.
Notification of the First Office Action from the State Intellectual Property Office of the People's Republic of China dated Nov. 26, 2012.

(56) References Cited

OTHER PUBLICATIONS

Office Action issued in corresponding Japanese Patent Application No. 2011-182905 dated Oct. 3, 2012.
R2-070143, 3GPP TSG-RAN-WG2 Meeting #56bis, Sorrento, Italy, Jan. 15-19, 2007.
R2-080176, 3GPP TSG RAN WG2 Meeting #60bis, Sevilla, Spain, Jan. 14-18, 2008.
R2-080631, 3GPP TSG-RAN2 Meeting #60bis, Sevilla, Spain, Jan. 14-18, 2008.
Office Action issued by the U.S. Patent & Trademark Office on Jan. 8, 2013 in related U.S. Appl. No. 12/452,733.
U.S. Appl. No. 12/678,487 Office Action dated Sep. 12, 2012.
U.S. Appl. No. 12/671,020 Office Action dated Oct. 3, 2012.
Chinese Patent Application No. 200880107676.3 Office Action dated Sep. 7, 2012.
Office Action dated Jul. 15, 2014, issued by the Korean Intellectual Property Office in Korean Patent Application No. 10-2008-0089718.
Texas Instruments, "UL Synchronization Management in LTE_ACTIVE," Mar. 26-30, 2007, pp. 1-4.
ETSI, "Digital cellular telecommunications system (Phase 2+); Functional state 2 description of Location Services (LCS) in GERAN (3GPP TS 43.059 version 7.3.0 Release 7)," May 2007, pp. 1-70.
Office Action dated Nov. 16, 2010, in related U.S. Appl. No. 12/733,179.
Notice of Allowance dated Oct. 30, 2014, issued by the Korean Intellectual Property Office in Korean Patent Application No. 10-2008-0089718.

* cited by examiner

Control Plane (C-plane)

User Plane (U-plane)

METHOD OF TRANSMITTING RLC DATA

The present application claims the benefit of U.S. Provisional Application Nos. 61/037,309, filed Mar. 17, 2008, and 61/038,395, filed Mar. 20, 2008. The present application is also a national stage of PCT International Application No. PCT/KR2009/001342, filed Mar. 17, 2009.

TECHNICAL FIELD

The present invention relates to a method of transmitting RLC data.

BACKGROUND ART

In the related art, RLC data transmission was performed, but radio resources were unnecessarily wasted. As such, the related art technologies do not sufficiently address such issues, and thus do not offer appropriate solutions.

DISCLOSURE OF INVENTION

Technical Solution

The present inventors recognized at least the above-identified drawbacks of the related art. Based upon such recognition, the various features described hereafter have been conceived such that a method of transmitting RLC data is provided, which results in more efficient use of radio resources.

MODE FOR THE INVENTION

The inventive concepts and features herein related to a method of transmitting RLC data are explained in terms of a Long Term evolution (LTE) system or other so-called 4 G communication systems, which is an enhancement to current 3GPP technologies. However, such details are not meant to limit the various features described herein, which are applicable to other types of mobile and/or wireless communication systems and methods.

Hereafter, the term "mobile terminal" will be used to refer to various types of user devices, such as mobile communication terminals, user equipment (UE), mobile equipment (ME), and other devices that support various types of wireless communication technologies.

The present invention relates to an LTE system in which an RLC layer of a transmitting side transmits a status report to an RLC layer of a receiving side. In particular, when the transmitting side sends a polling message, after polling is triggered, the transmission of the polling message is determined according to a message received from the receiving side.

Figure 1:
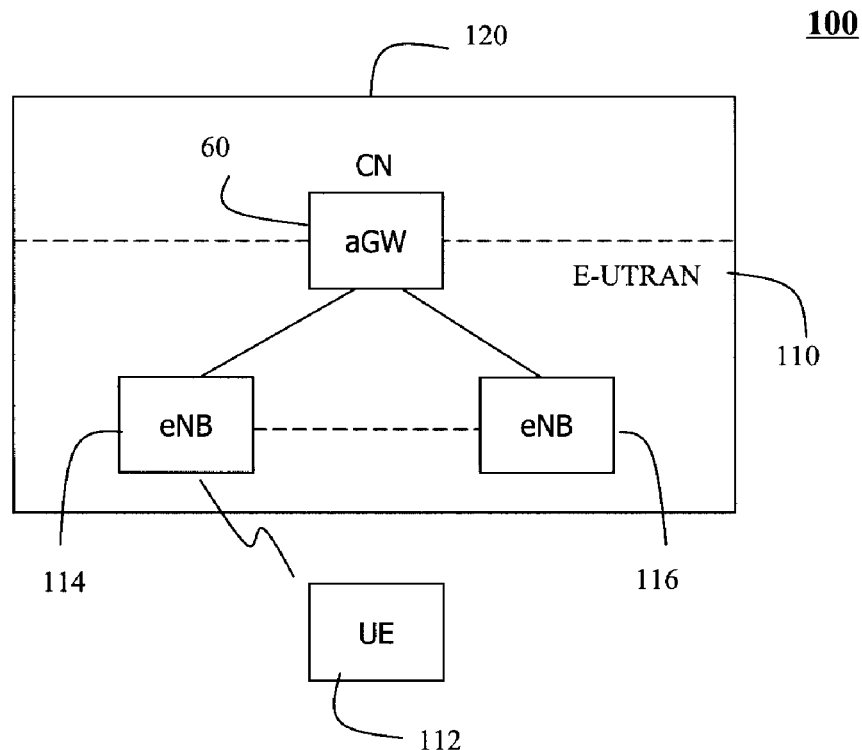
FIG. 1 shows an exemplary network architecture of a LTE system.

FIG. 1 shows an exemplary network architecture of an LTE system. The LTE system is a system that has evolved from the UMTS system, and its basic standardization work is being performed at the 3GPP organization.

The LTE network 100 can be largely divided into the E-UTRAN (Evolved UMTS Terrestrial Radio Access Network) 110 the CN (Core Network) 120. The E-UTRAN 110 may be comprised of UE (user equipment) 112 and at least one evolved Node B (eNB) 114, 116. An access gateway (aGW) 60 that allows connection with an external network may be located at an end of the E-UTRAN. The aGW may be divided into a section that handles the processing of user traffic and a section that handles the processing of control traffic. Here, between an aGW that processes new user traffic and an aGW that processed control traffic, a new interface can be used to allow communication therebetween. A single eNB can have one or more cells. The CN may be comprised of nodes (possible the aGW) that are used for UE user registration and other procedures. An interface may be used to differentiate between the E-UTRAN and the CN.

Figure 2:
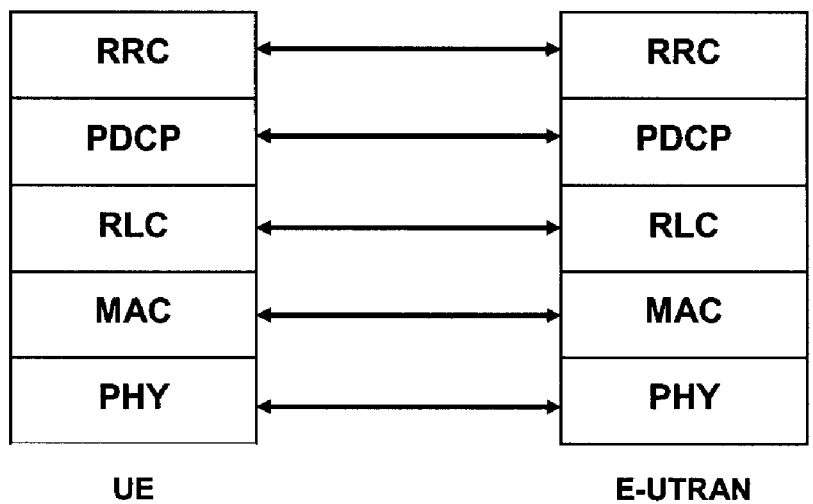
FIG. 2 shows an exemplary protocol stack for peer entities in the UE and E-UTRAN for the control plane.
Figure 3:
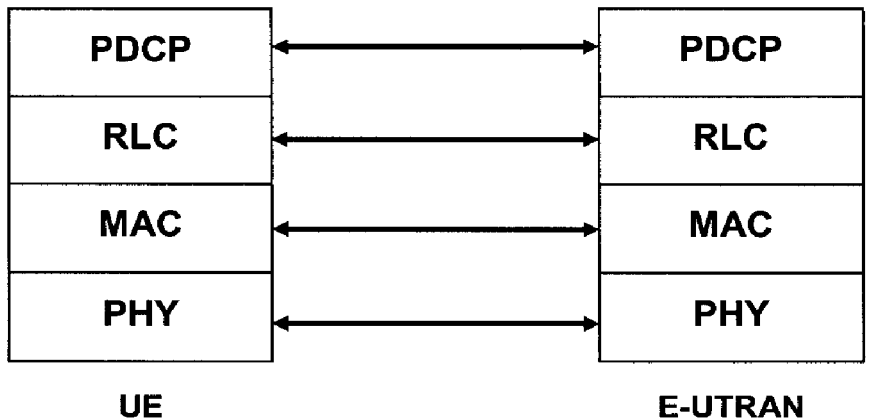
FIG. 3 shows an exemplary protocol stack for peer entities in the UE and E-UTRAN for the user plane.

FIGS. 2 and 3 show an exemplary structure of the radio interface protocol between the mobile terminal and the E-UTRAN based on the 3GPP standard.

The radio interface protocol is divided horizontally into the Physical Layer, the Data Link Layer, and the Network Layer, and is divided vertically into the User Plane (U-Plane) for transmitting data and information and the Control Plane (C-Plane) used to transfer control signaling. The protocol layers of FIGS. 2 and 3 are based on the Open System Interconnection (OSI) standard model well-known in communication systems, and can thus be divided into L1 (Layer 1), L2 (Layer 2), and L3 (Layer 3). Such radio protocol layers exist in both the mobile terminal and in the E-UTRAN as pair (or peer) entities to handle data transfers over the radio interface.

Hereafter, the control plane of the radio protocol in FIG. 2 and the user plane of the radio protocol in FIG. 3 will be described respectively.

In Layer 1, the physical layer uses one or more physical channels to provide an information transfer service. The physical layer is connected to the MAC (Medium Access Control) layer located above via one or more transport channels, and data is transferred between the MAC layer and the physical layer through these transport channels. Here, the transport channels can be divided into dedicated transport channel and common transport channels based on whether the transport channels are shared or not. Also, between respectively different physical layers, such as the physical layer in the transmitter (transmitting side) and the physical layer in the receiver (receiving side), data is transferred via one or more physical channels.

In Layer 2, there are many layers. The MAC layer provides service to a RLC (Radio Link Control) layer, which is an upper layer, via one or more logical channels which are mapped to various transport channels. Also, logical channel multiplexing is performed for mapping many logical channels to one transport channel. The MAC layer is connected to the RLC layer via logical channels, which are comprised of control channels used to transport control plane information and traffic channels used to transport user plane information.

The RLC layer supports the transmission of data with reliability, by performing segmentation and concatenation of data received from an upper layer and to adjust the data size to be appropriate for transmission from the lower layer over the radio interface. Also, in order to guarantee the various quality of service (QoS) requirement for each radio bearer (RB), three modes of operation are provided: TM (Transparent Mode), UM (Unacknowledged mode), and AM (Acknowledged mode). In particular, the AM RLC uses an Automatic Repeat and Request (ARQ) function to perform retransmissions in order to achieve reliable data transmissions.

The PDCP (Packet Data Convergence Protocol) layer in Layer 2 performs a header compression function to reduce the header size for Internet Protocol (IP) packets that contain relatively large and unnecessary control information such that IP packets (such as for IPv4, IPv6, etc.) may be effectively transmitted over the radio interface having relatively small bandwidth. Also, the PDCP layer is used for performing coding of control plane (C-plane) data, such as RRC messages. The PDCP layer can also perform coding of user plane (U-plane) data. In the LTE system, the PDCP layer performs a security function by performing ciphering to prevent third parties from eavesdropping on data transmissions and performing integrity protection to prevent undesired data manipulation by third parties.

Located at the uppermost portion of Layer 3, the RRC (Radio Resource Control) layer is only defined in the control plane and is responsible for the control of logical channels, transport channels and physical channels with relation to the configuration, re-configuration and release of radio bearers (RBs). Here, a radio bearer is a service or logical path provided by Layers 1 and 2 for transferring data between the mobile terminal and E-UTRAN. The establishment of an RB refers to managing the characteristics of the radio protocol layers and channels needed for providing a particular service, and the process of setting the specific parameters and operation methods thereof. The radio bearers can be divided into signaling radio bearers (Signaling RBs: SRB) and data radio bearers (Data RBs: DRB), whereby the SRB is used to transport RRC messages in the C-plane, and the DRB is used to transport user data in the U-plane.

Hereafter, the RLC layer will be considered in more detail.

The RLC layer has three modes: TM, UM and AM. For TM, because the RLC need not perform any functions, only the UM and AM will be considered.

For each PDU, the UM RLC sends a PDU header that contains a sequence number (SN) and transmits the same, such that the receiving side can know what PDUs were lost (missing) during transmission. Due to such functions, the UM RLC in the user plane handles the transmission of broadcast/multicast data and the transmission of real time data of the packet service (PS) domain such as voice (VoIP) and streaming, while the UM RLC in the control plane handles the transmission of certain RRC messages (that do not require reception response messages among the RRC messages) to a particular mobile terminal within a cell or a particular mobile terminal group.

Like the UM RLC, the AM RLC generates a PDU by adding a PDU header that includes a sequence number (SN), but unlike UM RLC, the receiving side provides an acknowledgement for the PDU transmitted from the transmitting side. The reason for this is for the receiving side to request the transmitting side to retransmit the PDUs that were not received properly. Such retransmission function is the biggest characteristic of the AM RLC. As a result, the AM RLC has the purpose of guaranteeing error-free data transmissions by using retransmissions, and due to such purpose, the AM RLC usually handles non-real time packet data transmissions such as TCP/IP of the PS domain, and in the control plane, also handles the transmission of certain RRC messages (that require reception acknowledgements among the RRC messages) to particular mobile terminal within a cell.

With respect to directions, the UM RLC is used in uni-direction communications, while the AM RLC is used in bi-directional communications because there is feedback. There are also differences in structural aspects, as the UM RLC has separate RLC entities respectively having a structure that only performs either transmissions or receptions, while the AM RLC has one RLC entity that includes both a transmitting side and receiving side therein.

The AM RLC entity is complicated due to its retransmission function. To manage retransmissions, the AM RLC also has a retransmission buffer in addition to a transmission/reception buffer. For flow control, a transmission/reception window is used. Between peer RLC entities in the transmitting side and receiving side, various types of functions including polling (whereby the transmitting side requesting the receiving side for state information), status report (whereby the receiving side reporting its buffer status to the transmitting side), generating a Status PDU (used for carrying the status report), and the like are performed. Also, in order to support all of these functions, the AM RLC requires many kinds of protocol parameters, state variables, timers and the like. For the status report, Status PDU, and the like, the AM RLC uses PDUs to control data transmissions (called Control PDUs) and uses PDUs to transfer user data (called Data PDUs).

In AM RLC, the RLC Data PDUs can be divided into AMD PDUs and AMD PDU Segments. An AMD PDU Segment has a portion of the data for the AMD PDU. In the LTE system, the maximum size of the data block(s) that the mobile terminal transmits can be changed or varied. Thus, for example, assuming that at a certain point in time, after the transmitting side AM RLC entity generates and transmits a 200 byte AMD PDU, a NACK is received from the receiving side AM RLC, and when the transmitting AM RLC wishes to retransmit such AMD PDU. Then, if the maximum size of the data block that can be transmitted has changed to 100 bytes, the AMD PDU cannot be retransmitted because it is too large. The AMD PDU segments, which are smaller units of the corresponding AMD PDU, can be used in such situations. Thus, in the above procedures, the AM RLC entity of the transmitting side can divide the AMD PDU into AMD PDU segments for transmission at different times, and the AM RLC entity of the receiving side can reconstruct the entire AMD PDU from the AMD PDU segments.

As described above, the AM RLC operates based on retransmissions using the status report. Namely, the AM RLC entity at the transmitting side sends a RLC Data PDU to the receiving side, and based on the status report from the receiving side, the transmitting side retransmits any RLC Data PDUs that were not properly received.

However, just as the RLC Data PDUs can be lost over the radio interface, the status report itself can also be lost (or become erroneous) over the radio interface. Also, if only the receiving side determines when the status report will be sent, the transmitting side may sometime not be able to receive the status report when it desires to. To solve these problems, a polling procedure is used.

The polling procedure refers to when the transmitting side sends a RLC Data PDU, upon setting the polling bit existing in the header of the RLC Data PDU. The receiving side that received such RLC Data PDU, checks the polling bit in the header, and if the polling bit was set, a status report is transmitted.

However, in such procedure, the RLC Data PDU including the set polling bit may be lost over the radio interface (or some type of error may occur). Thus, the transmitting side uses a specific timer called a T-poll-retransmit, which operates in the following manner:

```
Expiry of poll retransmit timer:
    The transmitting side of an AM RLC entity shall:
        start T_poll_retransmit upon setting the P field for a RLC data PDU to
        "1", and store the SN of the corresponding RLC data PDU in memory;
        stop T_poll_retransmit when it receives either a positive or negative
        acknowledgement for the corresponding RLC data PDU with the SN it
        stored in memory;
        when T_poll_retransmit expires:
            if both the transmission buffer and the retransmission buffer are
            empty (excluding transmitted RLC data PDU awaiting for
            acknowledgements):
                consider the AMD PDU with SN = VR(S) − 1 for retransmission;
                set the P field of the RLC data PDU to be transmitted in the next
                transmission opportunity to "1";
            else:
                set the P field of the RLC data PDU to be transmitted in the next
                transmission opportunity to"1" .
```

However, the above procedure has some problems. In LTE, the mobile terminal is not able to perform transmissions on the uplink whenever it wishes to do so. Namely, in LTE, when the mobile terminal has some data to be transmitted on the uplink, the needed amount of buffer resources is informed to the base station (eNB), then, uplink transmission is performed by using the radio resources allocated from the base station (eNB). The time from when the mobile terminal generates certain data that should be transmitted until the time of actually transmission may take between about 10 ms to about 100 ms.

Accordingly, in the above procedure, even when a poll has been triggered, such poll may be transmitted some time later after triggering. Also, while waiting to transmit the poll that was triggered, a status report from the receiving side may arrive. In such case, sending of the poll that was triggered may have become useless due to the newly received status report, and thus radio resources are wasted.

Accordingly, the present invention improved the polling procedure for AM RLC, such that unnecessary polling and unnecessary RLC Data PDU transmission can be minimized.

To achieve this, according to the present invention, after a poll is triggered and until the transmitting side AM RLC entity can actually perform transmissions, it is checked to see whether a status report has been received from the receiving side. Only if it is determined that a status report was not received, then the RLC Data PDU related to the triggered poll is transmitted.

The following shows an example of this operation.

Thus, in the present invention, when the T_Poll_Retransmit timer expires, then the AM RLC entity of the transmitting side considers that a poll was triggered. Also, the transmitting side RLC entity waits until the next transmission opportunity that is informed from a lower layer indicating the RLC Data PDU transmission is possible. During this wait time, if a status report (that includes ACK-NACK information with respect to sequence numbers of PDUs stored upon receipt from the receiving side) is received, the triggered poll is canceled. But is a status report is not received, the poll bit of the RLC Data PDU is set to 1 and then transmitted.

The above described operations can be implemented in various ways. For example, when a poll is triggered, the mobile terminal can immediately generate the RLC Data PDU having its poll bit set to 1. Then, if a status report is received before the RLCE Data PDU can be actually transmitted (i.e., before the lower layer informs about the transmission opportunity), then the RLC Data PDU can be deleted or discarded. In contrast, if a status report is not received until the transmission opportunity is informed from the lower layer, the RLC Data PDU is transferred to the lower layer from transmission thereof.

Figure 4:
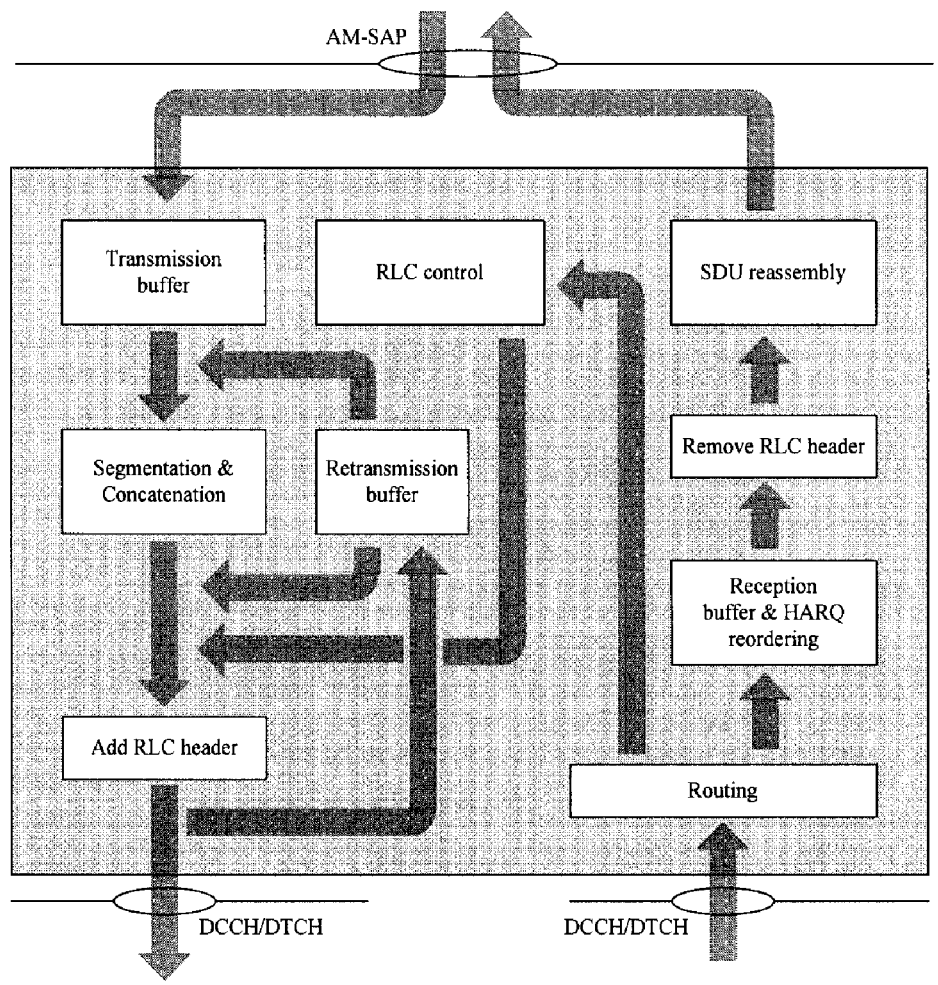
FIG. 4 shows an exemplary AM RLC entity structure.

FIG. 4 shows an exemplary AM RLC entity structure.

An AM RLC entity can be configured to deliver/receive RLC PDUs through the following logical channels: DL/UL DCCH or DL/UL DTCH. An AM RLC entity delivers/receives the following RLC data PDUs: AMD PDU; AMD PDU segment. An AM RLC entity delivers/receives the following RLC control PDU: STATUS PDU.

```
Expiry of poll retransmit timer:
    The transmitting side of an AM RLC entity shall:
        start T_poll_retransmit upon setting the P field for a RLC data PDU to
        "1", and store the SN of the corresponding RLC data PDU in memory;
        stop T_poll_retransmit when it receives either a positive or negative
        acknowledgement for the corresponding RLC data PDU with the SN it
        stored in memory;
        when T_poll_retransmit expires:
            if either a positive or negative acknowledgement for the
            corresponding RLC data PDU with the SN it stored in memory was not
            received until the next transmission opportunity:
                if both the transmission buffer and the retransmission buffer are
                empty (excluding transmitted RLC data PDU awaiting for
                acknowledgements):
                    consider the AMD PDU with SN = VR(S) − 1 for
                    retransmission;
                    set the P field of the RLC data PDU to be transmitted in
                    the next transmission opportunity to "1";
                else:
                    set the P field of the RLC data PDU to be transmitted in
                    the next transmission opportunity to "1".
```

Figure 5:
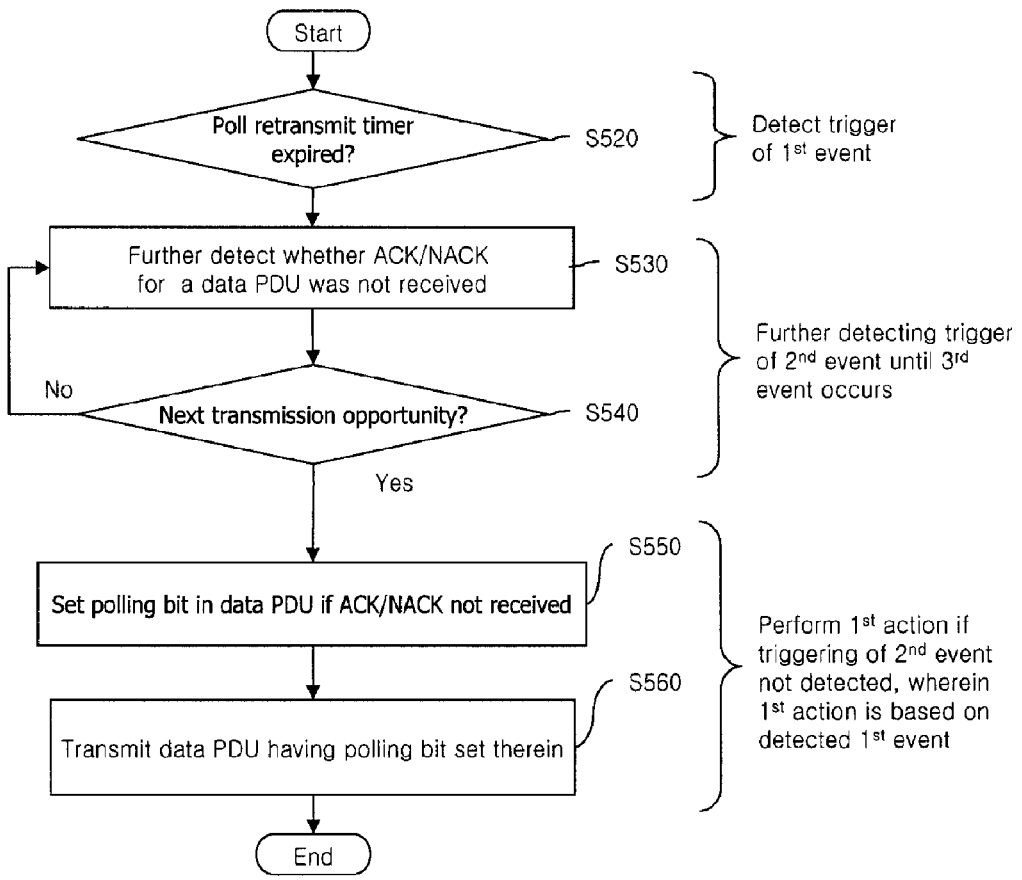
FIG. 5 shows an exemplary flow chart of the procedures for an improved method of transmitting RLC data.

FIG. 5 shows an example flow chart of how the improved RLC data transmission method is performed.

First, it is detected whether the poll retransmit timer has expired or not (S520). If so, a checking step to see whether a ACK signal or a NACK signal was not received with respect to a data PDU (S530). This checking step is performed unit the next transmission opportunity occurs (S540).

If in the checking step, it is found that a ACK or NACK has not been received, then the polling bit is set (S550), and the data PDU having the set polling bit is transmitted (S560).

The features and aspects of the present invention can also be considered in the following manner. Namely, the step of checking whether a ACK or NACK signal is received may be performed either before or after the expiry of the poll retransmit timer. As a result, if the ACK or NACK is not received as a result of the checking step, then the polling bit is set and the RLC Data PDU is transmitted.

As such, it can be said that the present invention provides an "additional confirmation period" during which the possible reception of a ACK or NACK signal from the receiving side is double-checked to ensure that the polling bit should really be set. The duration of this additional confirmation period can be pre-set or varied as necessary. For example, the checking step is performed until a next transmission opportunity occurs.

The present invention specifies the E-UTRA Radio Link Control (RLC) protocol for the UE-E-UTRAN radio interface. The features herein are related to E-UTRA RLC sublayer architecture; E-UTRA RLC entities; services expected from lower layers by E-UTRA RLC; services provided to upper layers by E-UTRA RLC; E-UTRA RLC functions; elements for peer-to-peer E-UTRA RLC communication including protocol data units, formats and parameters; and handling of unknown, unforeseen and erroneous protocol data at E-UTRA RLC.

The following definitions should be noted: byte segment: A byte of the Data field of an AMD PDU. Specifically, byte segment number 0 corresponds to the first byte of the Data field of an AMD PDU; Data field element: An RLC SDU or an RLC SDU segment that is mapped to the Data field; and RLC SDU segment: A segment of an RLC SDU.

Regarding retransmissions, the transmitting side of an AM RLC entity can receive a negative acknowledgement (notification of reception failure by its peer AM RLC entity) for an AMD PDU or a portion of an AMD PDU by the following:
  STATUS PDU from its peer AM RLC entity;
  HARQ delivery failure from the transmitting MAC entity.

When receiving a negative acknowledgement for an AMD PDU or a portion of an AMD PDU by a STATUS PDU from its peer AM RLC entity, the transmitting side of the AM RLC entity shall:
  if the SN of the corresponding AMD PDU falls within the STATUS receiving window:
  consider the AMD PDU or the portion of the AMD PDU for which a negative acknowledgement was received for retransmission.

When receiving a negative acknowledgement for an AMD PDU or a portion of an AMD PDU by HARQ delivery failure notification from the transmitting MAC entity, the transmitting side of the AM RLC entity may:
  if the SN of the corresponding AMD PDU falls within the STATUS receiving window:
  consider the AMD PDU or the portion of the AMD PDU for which a negative acknowledgement was received for retransmission.

When retransmitting an AMD PDU, the transmitting side of an AM RLC entity shall:
  if the AMD PDU can entirely fit into the TB of the particular transmission opportunity, deliver the AMD PDU as it is except for the P field (the P field should be set accordingly);
  otherwise, segment the AMD PDU and form a new AMD PDU segment which will fit into the TB of the particular transmission opportunity, in which case:

When retransmitting a portion of an AMD PDU, the transmitting side of an AM RLC entity shall:
  segment the portion of the AMD PDU as necessary and form a new AMD PDU segment which will fit into the TB of the particular transmission opportunity, in which case:

When forming a new AMD PDU segment, the transmitting side of an AM RLC entity shall:
  only map the Data field of the original AMD PDU to the Data field of the new AMD PDU segment;
  set the header of the new AMD PDU segment accordingly.

With respect to polling, an AM RLC entity can poll its peer AM RLC entity in order to trigger STATUS reporting at the peer AM RLC entity.

Triggers to initiate polling include:
Transmission of last data in the buffer:
  The transmitting side of an AM RLC entity shall set the P field of an RLC data PDU to "1" if both the transmission buffer and the retransmission buffer becomes empty (excluding transmitted RLC data PDU awaiting for acknowledgements) after the transmission of the RLC data PDU;
Expiry of poll retransmit timer:
  The transmitting side of an AM RLC entity shall:
  start T_poll_retransmit upon setting the P field for a RLC data PDU to "1", and store the SN of the corresponding RLC data PDU in memory;
  stop T_poll_retransmit when it receives either a positive or negative acknowledgement for the corresponding RLC data PDU with the SN it stored in memory;
  when T_poll_retransmit expires:
  if both the transmission buffer and the retransmission buffer are empty (excluding transmitted RLC data PDU awaiting for acknowledgements):
  consider the AMD PDU with SN=VR(S) ? 1 for retransmission;
  set the P field of the RLC data PDU to be transmitted in the next transmission opportunity to "1";
  else:
  set the P field of the RLC data PDU to be transmitted in the next transmission opportunity to "1".
Every Poll_PDU PDUs:
  The transmitting side of an AM RLC entity shall:
  maintain a counter PDU_WITHOUT_POLL, which is initially set to 0;
  increment PDU_WITHOUT_POLL by one for every new AMD PDU that it forms;
  reset PDU_WITHOUT_POLL to 0 when it delivers to lower layer a RLC data PDU whose P field is set to "1";
  set the P field of an AMD PDU that it forms to "1" when PDU_WITHOUT_POLL=Poll_PDU.
Every Poll_Byte bytes:
  The transmitting side of an AM RLC entity shall:
  maintain a counter BYTE_WITHOUT_POLL, which is initially set to 0;
  increment BYTE_WITHOUT_POLL for every new byte of Data field element that it maps to the Data field of an AMD PDU;
  reset BYTE_WITHOUT_POLL to 0 when it delivers to lower layer a RLC data PDU whose P field is set to "1";

set the P field of an AMD PDU that it forms to "1" when PDU_WITHOUT_POLL>=Poll_Byte.

With respect to status reporting, an AM RLC entity sends STATUS PDUs to its peer AM RLC entity in order to provide positive and/or negative acknowledgements of RLC PDUs (or portions of them).

RRC configures whether or not the status prohibit function is to be used an AM RLC entity.

Triggers to initiate STATUS reporting include:
Polling from its peer AM RLC entity:
The receiving side of an AM RLC entity shall trigger a STATUS report when it receives a RLC data PDU with the P field set to "1" and the HARQ reordering of the corresponding RLC data PDU is completed.

Detection of reception failure of an RLC data PDU:
The receiving side of an AM RLC entity shall trigger a STATUS report when T_reordering expires.

NOTE: The expiry of T_reordering triggers both VR(MS) to be updated and a STATUS report to be triggered, but the STATUS report shall be triggered after VR(MS) is updated.

When STATUS reporting has been triggered, the receiving side of an AM RLC entity shall:
if T_status_prohibit is not running:
at the first transmission opportunity indicated by lower layer, construct a STATUS PDU and deliver it to lower layer;
else:
at the first transmission opportunity indicated by lower layer after T_status_prohibit expires, construct a STATUS PDU and deliver it to lower layer;

NOTE: If T_status_prohibit is not running at the time STATUS reporting was triggered, the STATUS PDU size shall be accounted for in the Buffer Status Report [3] from the time STATUS reporting was triggered. If T_status_prohibit is running at the time STATUS reporting was triggered, the STATUS PDU size shall be accounted for in the Buffer Status Report [3] from the time T_reordering expires.

When a STATUS PDU has been delivered to lower layer, the receiving side of an AM RLC entity shall:
start T_status_prohibit.

When constructing a STATUS PDU, the AM RLC entity shall:
set ACK_SN to VR(MS);
for each AMD PDU with SN such that VR(R)<=SN<VR(MS) that has not been completely received yet:
if no byte segments have been received yet for an AMD PDU:
include in the STATUS PDU a NACK_SN which is set to the SN of the AMD PDU;
else
include in the STATUS PDU a set of NACK_SN, SOstart and SOend for each consecutive byte segments of the AMD PDU that has not been received yet.

Meanwhile, RLC re-establishment is performed upon request by RRC, and the function is applicable for AM and UM RLC entities.

When RRC indicates that an RLC entity should be re-established, the RLC entity shall:
if it is a receiving UM RLC entity:
when possible, reassemble RLC SDUs from UMD PDUs with SN<VR(UMR), remove RLC headers when doing so and deliver the reassembled RLC SDUs to upper layer;
discard all remaining UMD PDUs;
if it is a transmitting UM RLC entity:
discard all RLC SDUs;
if it is an AM RLC entity:
when possible, reassemble RLC SDUs from any byte segments of AMD PDUs with SN<VR(MR) in the receiving side, remove RLC headers when doing so and deliver the reassembled RLC SDUs to upper layer;
discard the remaining AMD PDUs and byte segments of AMD PDUs in the receiving side;
discard all RLC SDUs and AMD PDUs in the transmitting side;
discard all RLC control PDUs.
stop and reset all timers;
reset all state variables to their initial values.

The RLC polling procedure will be discussed further.

There are several triggers for polling. "Transmission of last data in the buffer", "Expiry of poll retransmit timer", "Every Poll_PDU PDUs" and "Every Poll_Byte bytes" is used for poll trigger.

Regarding the UE procedure when a Poll is sent, following text applies:
start T_poll_retransmit upon setting the P field for a RLC data PDU to "1", and store the SN of the corresponding RLC data PDU in memory.

Namely, whenever a Poll is sent, AM RLC entity memorizes the SN that included the Poll and starts T_poll_retransmit. These actions are used to check whether the Poll is successfully transmitted, and to retransmit a Poll if the previous transmission of Poll was not successful.

But as stated above, Polls can be triggered by several occasions. So, in some cases, another Poll can be triggered while the AM RLC entity waits for the reception of Status Report for the previous Poll. In this situation, following is not clear:
T_poll_retransmit is configured per Poll and SN is stored per Poll?
Or, the stored SN is updated and T_poll_retransmit is restarted whenever a Poll is sent?

The purpose of T_poll_retransmit is to ensure that a AM RLC transmitter receives a Status Report from a AM RLC receiver. As long as the transmitter runs at least one one T_poll_retransmit timer and restarts it for the newly-sent Poll, the transmitter will eventually receive an intended Status Report. Furthermore, running several T_poll_retransmit timers simultaneously will just cause additional transmission of Poll and Status Report, leading to waste of radio resources. Thus, only one T_poll_retransmit should be used regardless of how many poll is triggered.

Proposal 1: Only one T_poll_retransmit timer is used and restarted whenever a new Poll is sent.

When a AM RLC receiver sends Status Reports, later Status Report includes more up-to-date information than the earlier Status Report. And the later Poll is normally sent with a higher SN than the previous Poll. To ensure that AM transmitter will receive a Status Report regarding up to the PDU with highest SN, the stored SN related to a Poll should be updated whenever a Poll is sent.

Proposal 2: A SN stored for a Poll is updated whenever a new Poll is sent.

When a Poll was triggered for a last data in the buffer and if a Status Report is not received for that data, another poll is trigged and the last PDU itself is sent again. Regarding this scenario, following text applies:
when T_poll_retransmit expires:
if both the transmission buffer and the retransmission buffer are empty (excluding transmitted RLC data PDU awaiting for acknowledgements):
consider the AMD PDU with SN=VR(S) ? 1 for retransmission;
set the P field of the RLC data PDU to be transmitted in the next transmission opportunity to "1".

Here, "consider for retransmission" means that the concerned AMD PDU (segment) should be retransmitted at the earliest transmission opportunity.

The problem is that the time of Poll trigger is not always same as the time of next transmission opportunity. Depending on the time when UL GRANT is received or depending on the result of Logical Channel Prioritization, the time difference between Poll trigger and actual Poll transmission will be quite long.

In this case, the question is what if Status Report that acknowledges the reception of the last AMD PDU is received during the time that the transmitter waits for the transmission opportunity? The most logical procedure is to transmit neither a Poll nor the last AMD PDU. But, according to the current specification, the transmitter should re-transmit the last AMD PDU that will be eventually discarded due to the function of "duplicate detection". Furthermore, the radio resource is also wasted. Thus, the triggered Poll and the AMD PDU should not be retransmitted.

In addition, the time of starting of T_poll_retransmit should be changed to the moment when the actual RLC data PDU with Poll is delivered to lower layer.

Proposal 3: An AMD PDU which is considered for retransmission is not transmitted if acknowledgement for the AMD PDU is received before the next transmission opportunity.

Proposal 4: A Poll triggered by T_poll_retransmit is cancelled if a Status Report which includes ACK or NACK for the AMD PDU with equal SN to the Stored SN is received before the next transmission opportunity.

Proposal 5: T_poll_retransmit is started when RLC data PDU with poll is delivered to lower layer.

Hereafter, the polling procedure can be summarized as follows:

An AM RLC entity can poll its peer AM RLC entity in order to trigger STATUS reporting at the peer AM RLC entity.
Triggers to initiate polling include:
Transmission of last data in the buffer:
The transmitting side of an AM RLC entity shall set the P field of an RLC data PDU to "1" if both the transmission buffer and the retransmission buffer becomes empty (excluding transmitted RLC data PDU awaiting for acknowledgements) after the transmission of the RLC data PDU;
Expiry of poll retransmit timer:
The transmitting side of an AM RLC entity shall:
upon delivering a new RLC data PDU with the P field set to "1" to lower layer;
if T_poll_retransmit is not running:
start T_poll_retransmit;
store the SN of the corresponding RLC data PDU in memory;
else:
restart T_poll_retransmit;
replace the stored SN in memory with the SN of the corresponding RLC data;
stop T_poll_retransmit when it receives either a positive or negative acknowledgement for the corresponding RLC data PDU with the SN it stored in memory;
when T_poll_retransmit expires, if either a positive or negative acknowledgement for the corresponding RLC data PDU with the SN it stored in memory was not received until the next transmission opportunity:
if both the transmission buffer and the retransmission buffer are empty (excluding transmitted RLC data PDU awaiting for acknowledgements):
consider the AMD PDU with SN=VR(S) ? 1 for retransmission;
set the P field of the RLC data PDU to be transmitted in the next transmission opportunity to "1";
else:
set the P field of the RLC data PDU to be transmitted in the next transmission opportunity to "1".
Every Poll_PDU PDUs:
The transmitting side of an AM RLC entity shall:
maintain a counter PDU_WITHOUT_POLL, which is initially set to 0;
increment PDU_WITHOUT_POLL by one for every new AMD PDU that it forms;
reset PDU_WITHOUT_POLL to 0 when it delivers to lower layer a RLC data PDU whose P field is set to "1";
set the P field of an AMD PDU that it forms to "1" when PDU_WITHOUT_POLL=Poll_PDU.
Every Poll_Byte bytes:
The transmitting side of an AM RLC entity shall:
maintain a counter BYTE_WITHOUT_POLL, which is initially set to 0;
increment BYTE_WITHOUT_POLL for every new byte of Data field element that it maps to the Data field of an AMD PDU;
reset BYTE_WITHOUT_POLL to 0 when it delivers to lower layer a RLC data PDU whose P field is set to "1";
set the P field of an AMD PDU that it forms to "1" when PDU_WITHOUT_POLL>=Poll_Byte.

As for the effects of the present invention, unnecessary setting of the polling bit can be minimized such that RLC data PDU transmissions are reduced, which results in more efficient use of radio resources.

The present invention provides a method of transmitting data, the method comprising: detecting a triggering of a first event; further detecting a triggering of a second event until a third event occurs; and performing a first action if the triggering of the second event is not detected, wherein the first action is based on the detected first event.

If the triggering of the second even is detected, canceling the first event. The first event is an expiry of a poll retransmit timer, the second event is detecting whether a ACK or NACK signal is not received, and the third event is a next transmission opportunity. The first action may be setting a polling bit of a data PDU (protocol data unit) to be transmitted.

Also, the present invention provides a method of transmitting data, the method comprising: detecting an expiry of a poll retransmit timer; further detecting whether a positive or negative acknowledgement for a (RLC) data PDU was not received, the further detecting step being performed until the next transmission opportunity; if the positive or negative acknowledgement was not detected or received, setting a polling bit in the data PDU; and transmitting the data PDU having the polling bit set therein.

The next transmission opportunity occurs when an instruction is received from the MAC layer indicating that transmission is possible because radio resources are available. The radio resources are used for supporting OFDM. The further detecting step is performed during a further confirmation period defined as a fixed or variable time duration. Also, the further detecting step may be timer-based.

The various features and concepts described herein may be implemented in software, hardware, or a combination thereof. For example, a computer program (that is executed in a computer, a terminal or a network device) for a method and system for transmitting RLC data may comprise one or more program code sections for performing various tasks. Similarly, a software tool (that is executed in a computer, a terminal or a network device) for a method and system for processing a method of transmitting RLC data may comprise program code portions for performing various tasks.

The method and system for processing a method of transmitting RLC data according to the present invention are compatible with various types of technologies and standards. Certain concepts described herein are related to various types of standards, such as GSM, 3GPP, LTE, IEEE, 4G and the like. However, it can be understood that the above exemplary standards are not intended to be limited, as other related standards and technologies would also be applicable to the various features and concepts described herein.

INDUSTRIAL APPLICABILITY

The features and concepts herein are applicable to and can be implemented in various types of user devices (e.g., mobile terminals, handsets, wireless communication devices, etc.) and/or network entities that can be configured to support a method for transmitting RLC data.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. A method of transmitting Radio Link Control (RLC) data in a mobile communication system, the method comprising:
   detecting an expiry of a poll retransmit timer;
   if it is detected that the poll retransmit timer is expired, checking whether a positive or negative acknowledgement for an RLC data Protocol Data Unit (RLC data PDU) was not received, the checking step being performed until a next transmission opportunity, the next transmission opportunity occurring when an instruction is received from a Medium Access Control (MAC) layer indicating that a transmission for the RLC data PDU is possible because radio resource are available;
   if the positive or negative acknowledgement was not detected or received in the checking step and if both a transmission buffer and a retransmission buffer are empty, setting a polling bit in the RLC data PDU; and
   transmitting the RLC data PDU having the polling bit set therein,
   wherein a polling (P) field of the RLC data PDU is set to "1" after the transmission of the RLC data PDU,
   wherein only one poll retransmit timer is used during the transmission of one or more RLC data PDU comprising the polling bit,
   wherein, whenever an RLC data PDU comprising a new polling bit is transmitted:
     the retransmit timer is restarted, and
     a sequence number (SN) stored for the polling bit is updated,
   wherein the RLC data PDU comprising the polling bit is not transmitted if the positive acknowledgment is received before the next transmission opportunity,
   wherein a poll triggered by the poll retransmit timer is canceled if a sequence number of a status report is equal to the SN stored for the polling bit before the next transmission opportunity, and
   wherein the poll retransmit timer is started when the RLC data PDU comprising the polling bit is delivered to a lower layer.

2. The method of claim 1, wherein the radio resources are used for supporting OFDM.

3. The method of claim 1, wherein the checking step is performed during a further confirmation period defined as a fixed or variable time duration.

4. The method of claim 1, wherein the checking step is timer-based.

* * * * *